June 6, 1939.  H. C. BOWEN  2,161,279

FLUID PRESSURE SYSTEM

Filed May 14, 1937  2 Sheets—Sheet 1

INVENTOR.
HERBERT C. BOWEN
BY Williams, Bradbury
McCaleb & Hinkle
ATTORNEYS.

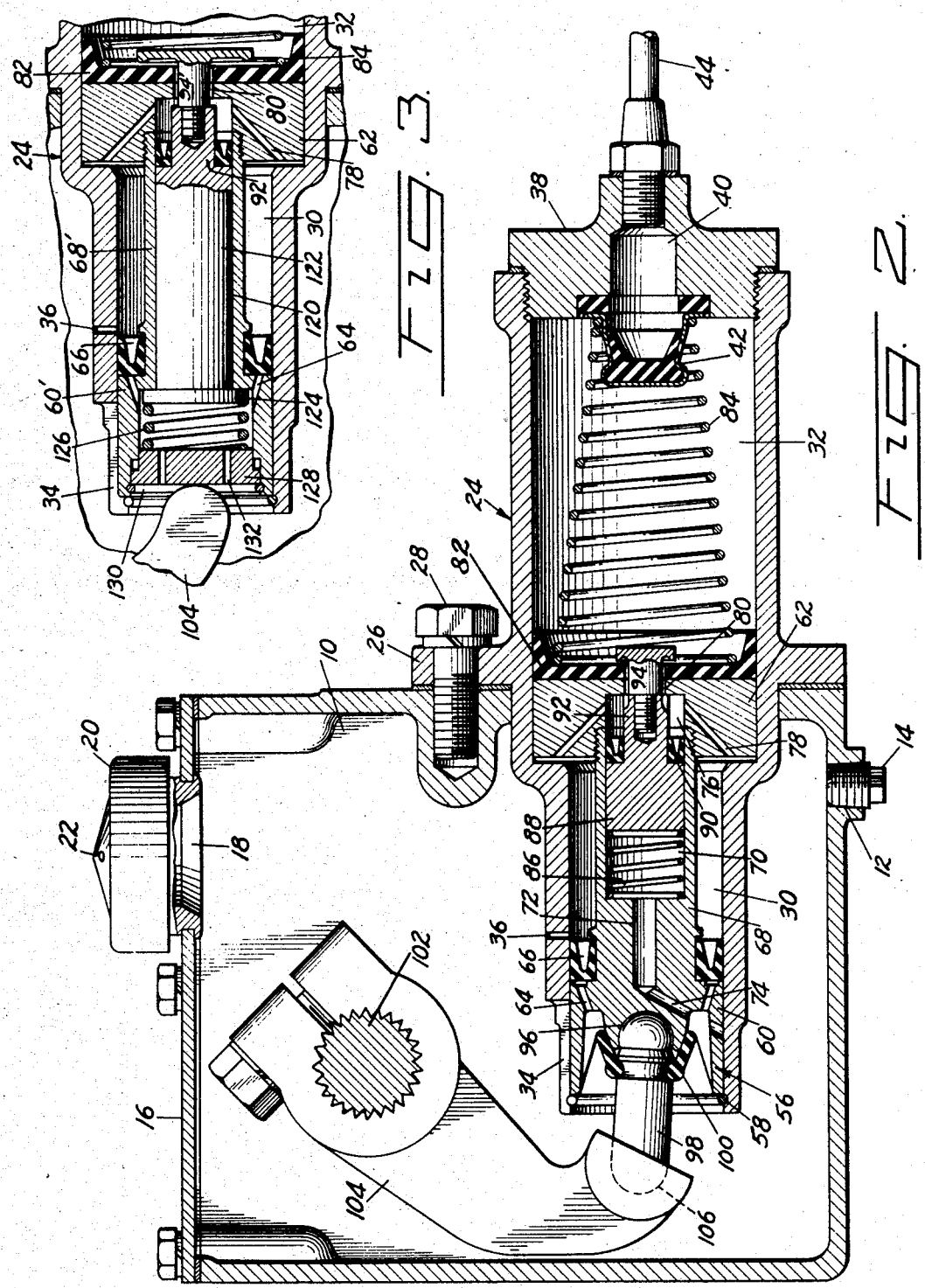

Patented June 6, 1939

2,161,279

UNITED STATES PATENT OFFICE 2,161,279

FLUID PRESSURE SYSTEM

Herbert C. Bowen, Detroit, Mich., assignor to Hydraulic Brake Company, Detroit, Mich., a corporation of California Application May 14, 1937, Serial No. 142,540.

8 Claims. (Cl. 60—54.6)

This invention relates to fluid pressure systems.

An object of the invention is to provide a fluid pressure system wherein pressure is stepped down rather than up as is the practice in the majority of such systems now in use.

Another object of the invention is to provide a fluid pressure system wherein the maximum pressure may be attained with the least possible effort during the initial operation.

Another object of the invention is to provide a fluid pressure producing device including a high pressure producing means and a low pressure producing means operative to gradually transfer the pressure from the high to the low pressure producing means without shock or vibration.

Other objects and advantages of the invention will appear from the following description taken in connection with the accompanying drawings forming a part of this specification, and in which—

Fig. 2 is a vertical sectional view of the fluid pressure producing device; and

Fig. 3 is a fragmentary view mostly in section illustrating a modification of the fluid pressure producing device.

Figure 1:
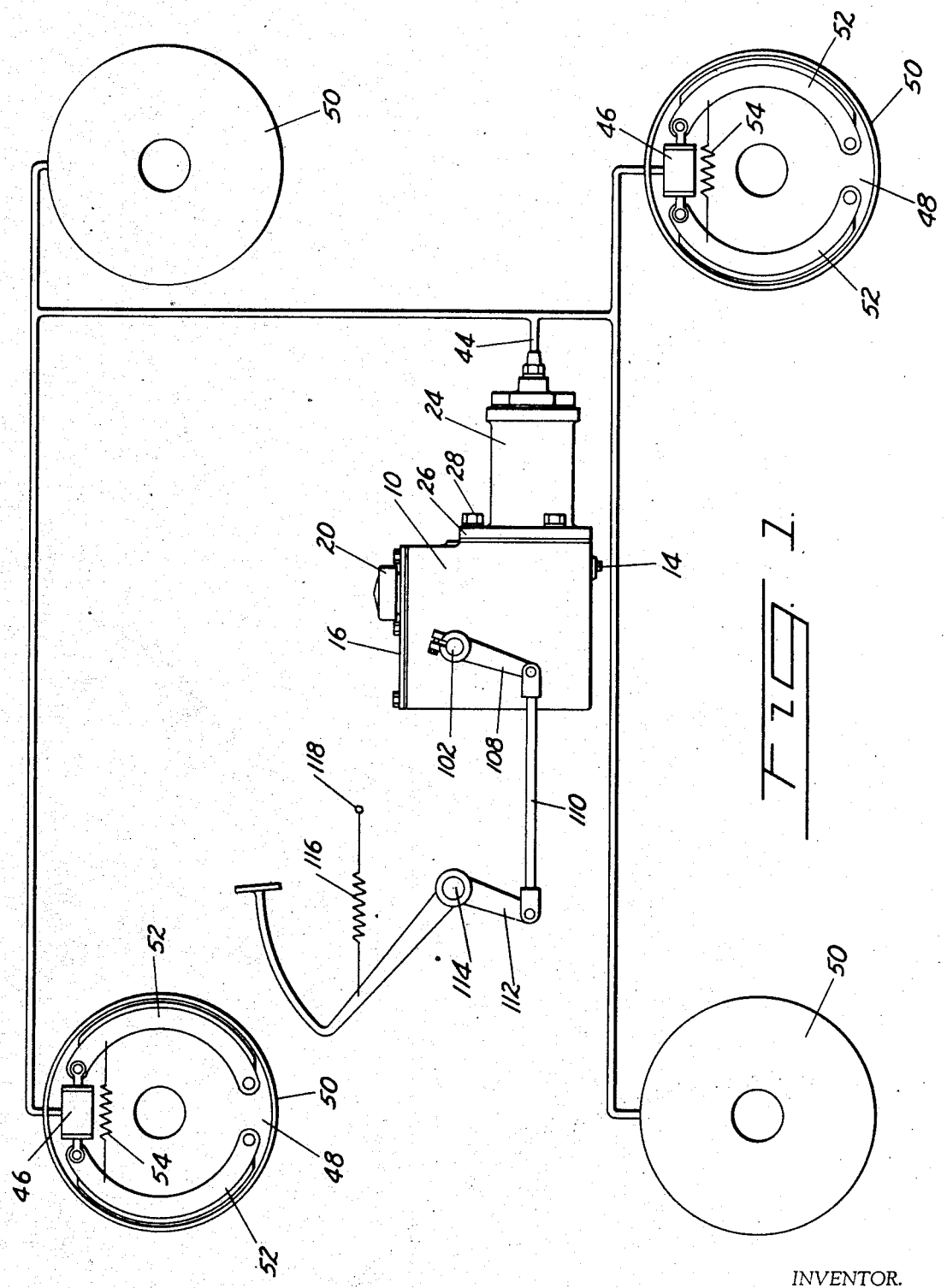
Fig. 1 is a diagrammatical illustration of a fluid pressure braking system embodying the invention.

Referring to the drawings for more specific details of the invention, 10 represents a fluid reservoir having a drain opening 12 normally closed as by a plug 14. The reservoir also has a removable top 16 provided with a filling opening 18 normally closed as by a cap 20 having suitable openings 22 for venting the reservoir to the atmosphere.

A cylinder 24 fitted in an opening in the wall of the reservoir adjacent the bottom thereof has intermediate its length a radial flange 26 secured to the wall of the reservoir as by bolts 28 so as to support the cylinder partly within and partly outside of the reservoir. The cylinder includes a small chamber 30 and a large chamber 32, arranged concentrically to and in direct communication with one another. The small chamber 30 opens directly into the reservoir and is slotted as indicated at 34, and arranged in its wall is a port 36 providing another communication between the chamber and the reservoir. The large chamber 32 is forward of the small chamber 30, and this chamber has a head 38 provided with a discharge port 40 controlled as by a two-way valve 42.

A fluid pressure delivery pipe or conduit 44 suitably connected to the discharge port 40 has branches connected respectively to fluid pressure actuated motors 46 arranged in pairs, one pair for actuating the brakes associated with the front wheels of the vehicle and another pair for actuating the brakes associated with the rear wheels of the vehicle.

The brakes may be of conventional type, preferably each having a fixed support or backing plate 48, a rotatable drum 50 associated with the backing plate, a pair of corresponding interchangeable friction elements or shoes 52 pivoted on the backing plate, and a motor corresponding to the motors 46 mounted on the backing plate between the shoes 52 and operative to actuate the shoes into engagement with the drum 50 against the resistance of a retractile spring 54 connecting the shoes.

A piston 56 reciprocable in the cylinder is held against displacement by a retaining ring 58 seated in a groove in the wall of the cylinder adjacent the open end of the small chamber 30. The piston includes a small head 60 movable in the small chamber 30 and a relatively large head 62 movable in the large chamber 32. The small head 60 has a plurality of spaced ports 64 providing communications between the small chamber 50 and the reservoir, and a collapsible leak-proof cup 66 seated on the head controls the ports. The head 60 also has a concentric extension 68 bored to provide a chamber 70 and a passage 72 leading from the bottom of the chamber to a duct 74 through the head 60. The passage 72 and the duct 74 provide a communication between the chamber 70 and the reservoir.

The head 62 is suitably secured to the extension 68. It has a concentric chamber 76 contiguous with the chamber 70 in the extension 68, a plurality of spaced passages 78 providing communications between the chamber 76 and that portion of the cylinder back of the head 62, and an axial port 80 providing a communication between the chamber 76 and that portion of the cylinder forward of the head. A leak-proof cup 82 seated on the head 62 inhibits the seepage of fluid past the piston, and a spring 84 interposed between the cup and the two-way valve 42 retains the cup and valve against displacement and also serves to return the piston to its retracted position.

A spring 86 seated in the bottom of the chamber 70 in the extension 68 resiliently supports a piston 88 having on its head a leak-proof cup 90 for inhibiting the passage of fluid past the piston. This piston has a concentric extension 92 supporting a pin 94 extending through the port 80 with suitable clearance to provide for the free passage of fluid through the port, and the pin has a head for control of the port.

A recess 96 in the back of the piston head 60 receives one end of a thrust pin 98 secured against displacement by a flexible collar 100, and a shaft 102 mounted transversely of the reservoir has secured thereto within the reservoir an actuator 104 having in its free end a socket 106 receiving the other end of the thrust pin, and suitably secured to the shaft outside of the reservoir is an arm 108 connected as by a rod 110 to a foot pedal lever 112 pivotally mounted on a stub shaft 114 and connected by a retractile spring 116 to a fixed support 118.

In the modification, the small piston head 60' and the extension 68' thereon are bored to provide a chamber 120 of uniform cross-section extending through both the head and the extension. A piston 122 movable in the chamber 120 has a head 124 normally held against the back of the head 60' by a spring 126 interposed between the head 124 and a thrust block 128 slidably mounted in the skirt of the piston head 60'. The thrust block is held against displacement as by a retaining ring 130 seated in a groove in the skirt. This thrust block may be provided with a plurality of passages 132, or may be in the form of a spider, so as to provide for the passage of fluid between the reservoir and that portion of the cylinder forward of the head 60'. The piston 122 carries a pin 94' extending through the port 80, and the head of this pin is relatively large in comparison to the head of the corresponding pin illustrated in the preferred embodiment of the invention.

In a normal operation, upon depressing the foot pedal lever 112, force is transmitted from the lever through the rod 110, the arm 108, the shaft 102, the actuator 104 and the thrust pin 98 to the piston 56, resulting in moving the piston on its compression stroke. As the piston moves on its compression stroke the fluid in the chamber 30 forward of the piston head 60 is displaced therefrom through the passages 78, the chamber 76 and the port 80 in the piston head 62 into the chamber 32 and thence past the two-way valve 42 through the discharge port 40 and the fluid pressure delivery pipe 44 and its respective branches into the fluid pressure actuated motors 46, causing actuation of the motors resulting in movement of the shoes 52 into engagement with the drums 50.

During the above-described operation the maximum pressure on the fluid in the system is attained with the least possible applied operating force. This is highly desirable, especially where it is advantageous to cause the initial actuation of the fluid pressure actuated motors and the mechanism operated thereby with the least possible effort on the part of the operator.

Upon attaining a predetermined pressure in the chambers 30 and 32, the piston 88 in the chamber 70 retracts against the resistance of the spring 86, and the head on the pin 94 carried by the piston closes the port 80. Thereafter the pressure on the fluid in the chamber 32, the fluid pressure delivery pipe 44 and its respective branches, and the fluid actuated motors 46 connected to the branches is received on the head of the piston 62; and as the piston advances on its compression stroke the pressure on the fluid in the chamber 30 decreases due to the gradually increasing area forward of the piston head 60. This results in advancing the piston 88 under the influence of the spring 86 due to a differential in the load on the spring 86 and the fluid pressure on the head of the pin 94 attended by opening of the port 80 and equalization of pressure in the chambers.

When the pressure on the fluid in the chamber 30 again results in retraction of the piston 88 accompanied by closing of the port 80, the pressure in the chamber 32 received on the head of the pin 94 is adequate to retain the port 80 closed. This action materially smooths out the operation and accomplishes the transfer of the pressure from the high pressure producing means to the low pressure producing means without pulsation.

The operation of the modification is substantially the same as that of the preferred embodiment of the invention. In this modification there is a sufficient load on the spring 126 to receive the applied force on the thrust block 128 without yielding until a predetermined pressure on the fluid in the chambers 30 and 32 is attained, whereupon the spring 126 yields sufficiently for the head of the pin 94' to seat and close the port 80.

The head has a large area; accordingly, the pressure on the fluid in the chamber 32 acting on the head offers increased resistance to opening the port 80. However, the load on the spring 126 is variable and is constantly building up under the applied force as the piston advances on its compression stroke. This results in slowly advancing the piston 122 accompanied by opening of the port 80 and the passage of a small quantity of fluid from the chamber 32 to the chamber 30. When the pressure on the fluid in the chamber 30 is sufficient to again cause retraction of the piston 122 against the resistance of the spring 126 accompanied by seating of the head and closing of the port 80, the pressure in the cylinder 32 acting on the head of the pin 94' is sufficient to retain the port 80 closed.

In both the preferred embodiment of the invention and in the modification, at the end of an operation, the foot pedal lever 112 is released and the pedal together with the linkage connected thereto including the actuator 104 is returned to retracted position. This results in release of the piston 56 and return of the piston to its retracted position under the influence of the spring 84, also release of the piston 88 and advance of this piston under the influence of the spring 86 so as to establish communication between the chambers 30 and 32.

As the piston 56 returns to its retracted position, a partial vacuum is created in the cylinder resulting in drawing fluid from the reservoir through the ports 64 in the piston 60 past the cup 66 into the chamber 30, and thence through the passages 78, the chamber 76 and the port 80 in the piston 62 into the chamber 32, completely filling the cylinder. During this period fluid is returning to the cylinder from the fluid pressure actuated motors 46 and the fluid pressure delivery pipes connecting the motors to the cylinder. Under this condition the quantity of fluid received by the cylinder may be in excess of the quantity required, and such surplus fluid as may be received by the cylinder is returned to the reservoir by way of the compensating port 36.

Although this invention has been described in connection with certain specific embodiments, the principles involved are susceptible of numerous other applications that will readily occur to persons skilled in the art. The invention is, therefore, to be limited only by the appended claims.

Having thus described the various features of the invention, what I claim as new and desire to secure by Letters Patent is:

1. A fluid pressure device comprising means for creating pressure including a high and a low pressure producing means, a fluid outlet communicating with said low pressure producing means, and means operative upon subjecting the fluid to increasing pressure to transfer the pressure from the high to the low pressure producing means, said second mentioned means including a passage connecting said high and low pressure producing means, a valve in said passage, a spring normally holding said valve open, and a part exposed to the fluid pressure in the low pressure producing means for closing said valve.

2. A fluid pressure device comprising means for creating pressure including a high and a low pressure producing means, a fluid outlet communicating with said low pressure producing means, and means automatically operative upon subjecting the fluid to constantly increasing pressure to transfer the pressure from the high pressure producing means to the low pressure producing means, said second mentioned means including a passage connecting said high and low pressure producing means, a valve in said passage, a spring normally holding said valve open, and a part exposed to the fluid pressure in the low pressure producing means for closing said valve.

3. A fluid pressure device comprising a high and a low pressure producing means, a fluid outlet communicating with said low pressure producing means, and fluid pressure actuated means operative upon subjecting the fluid to a constantly increasing pressure to gradually transfer the pressure from the high to the low pressure producing means, said second mentioned means including a passage connecting said high and low pressure producing means, a valve in said passage, a spring normally holding said valve open, and a part exposed to the fluid pressure in the low pressure producing means for closing said valve.

4. A fluid pressure device comprising a high and a low pressure producing means, a fluid outlet communicating with said low pressure producing means, and fluid pressure actuated means operative at a predetermined pressure to transfer the pressure from the high to the low pressure producing means and at a higher pressure to relieve the pressure in the low pressure producing means and increase the pressure in the high pressure producing means and thereafter to transfer the pressure from the high to the low pressure producing means and gradually reduce the pressure in the high pressure producing means, said second mentioned means including a passage connecting said high and low pressure producing means, a valve in said passage, a spring normally holding said valve open, and a part exposed to the fluid pressure in the low pressure producing means for closing said valve.

5. A fluid pressure producing device comprising a reservoir, a cylinder supplied therefrom having a small chamber and a relatively large chamber forward of the small chamber, a fluid outlet communicating with the large chamber, a piston reciprocable in the cylinder having spaced heads movable in the respective chambers connected to one another, the head in the large chamber having a port, and a fluid pressure actuated valve controlling the port, said valve including a spring normally holding said valve open, and a part exposed to fluid pressure in the large chamber for closing the valve.

6. A fluid pressure producing device comprising a reservoir, a cylinder supplied therefrom having a small chamber and a relatively large chamber forward of the small chamber, a fluid outlet communicating with the large chamber, a piston reciprocable in the cylinder having spaced heads movable in the respective chambers, a sleeve connecting the piston heads having communication with the respective chambers, and a fluid pressure actuated valve in the sleeve controlling the communication between the sleeve and the large chamber, said valve including a spring normally holding said valve open, and a part exposed to fluid pressure in the large chamber for closing the valve.

7. A fluid pressure producing device comprising a reservoir, a cylinder supplied therefrom including a small chamber and a relatively large chamber forward of the small chamber, a fluid outlet communicating with the large chamber, a piston reciprocable in the cylinder including a small and a large head movable in the respective chambers, a sleeve connecting the heads and having communication with the reservoir and the respective chambers, and a fluid pressure actuated valve in the sleeve controlling the communication between the sleeve and the large chamber, said valve including a spring normally holding said valve open, and a part exposed to fluid pressure in the large chamber for closing the valve.

8. A fluid pressure producing device comprising a reservoir, a cylinder supplied therefrom having a small chamber and a relatively large chamber forward of the small chamber, a fluid outlet communicating with the large chamber, a piston reciprocable in the cylinder including a head movable in the small chamber having passages therethrough providing communications between the small chamber and the reservoir, a collapsible cup controlling the passages, a second head movable in the large chamber having a concentric chamber therein, passages providing communications between the concentric chamber and that portion of the cylinder back of the head and a port providing a communication between the concentric chamber and that portion of the cylinder forward of the piston, a sleeve carried by the head in the small chamber having communication with the reservoir, said sleeve secured to the head in the large chamber contiguous with the concentric chamber in the large head, and a fluid pressure actuated valve in the sleeve controlling the port in the head, said valve including a spring normally holding said valve open, and a part exposed to fluid pressure in the large chamber for closing the valve.

HERBERT C. BOWEN.